(12) United States Patent
Lee

(10) Patent No.: US 8,485,308 B2
(45) Date of Patent: Jul. 16, 2013

(54) ELECTRIC POWER STEERING APPARATUS

(75) Inventor: Jin Hwan Lee, Seongnam-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/222,552

(22) Filed: Aug. 31, 2011

(65) Prior Publication Data

US 2012/0055731 A1    Mar. 8, 2012

(30) Foreign Application Priority Data

Aug. 31, 2010    (KR) .................. 10-2010-0084884

(51) Int. Cl.
  *B62D 5/04*    (2006.01)
(52) U.S. Cl.
  USPC ............... 180/446; 180/443; 701/41; 701/42
(58) Field of Classification Search
  USPC ............... 180/443, 444, 446; 701/41, 42, 43
  See application file for complete search history.

(56) References Cited

U.S. PATENT DOCUMENTS

| | | | | |
|---|---|---|---|---|
| 7,136,732 B2* | 11/2006 | Shimizu et al. | .................. | 701/41 |
| 7,831,355 B2* | 11/2010 | Nishiyama | ....................... | 701/41 |
| 2003/0045981 A1* | 3/2003 | Kifuku et al. | ................... | 701/41 |
| 2009/0157261 A1* | 6/2009 | Yamazaki | ....................... | 701/42 |

* cited by examiner

*Primary Examiner* — Kevin Hurley
*Assistant Examiner* — Marc A Scharich
(74) *Attorney, Agent, or Firm* — McDermott Will & Emery LLP

(57) ABSTRACT

An electric power steering apparatus including a motor includes: a steering torque sensor; a speed sensor; an auxiliary steering force setting unit configured to output a signal representing a linear change of a gradual increase or decrease; a map setter configured to receive a signal output from the auxiliary steering force setting unit and to set an auxiliary steering force map where a maximum steering torque, a maximum target motor current, or a ratio of a target motor current to a steering torque at a specific speed gradually increases or decreases; a current signal supply configured to output the steering torque signal and a target motor current signal corresponding to the speed signal according to the auxiliary steering force map; and a motor driving unit configured to supply a current corresponding to the target motor current signal to the motor.

10 Claims, 5 Drawing Sheets

ELECTRIC POWER STEERING APPARATUS

CROSS-REFERENCE TO RELATED APPLICATION

This application claims priority from and the benefit under 35 U.S.C. §119(a) of Korean Patent Application No. 10-2010-84884, filed on Aug. 31, 2010, which is hereby incorporated by reference for all purposes as if fully set forth herein.

BACKGROUND OF THE INVENTION

1. Field of the Invention

The present invention relates to an electric power steering apparatus.

2. Description of the Prior Art

As generally known in the art, a steering apparatus for a vehicle is adapted to change a travelling direction of the vehicle by driver's own will, and is a type of auxiliary apparatus adapted to maneuver a vehicle in a direction desired by a driver by arbitrarily changing pivotal centers of front wheels of the vehicle.

A power steering apparatus for a vehicle supplements a steering wheel manipulating force of a driver using a booster when a driver manipulates a steering wheel of the vehicle, allowing the driver to easily change a travelling direction of the vehicle with a small force.

A recent power steering apparatus tends to allow a steering wheel to be manipulated with a heavy feeling while a vehicle travels at a high speed and to be manipulated with a light feeling while the vehicle travels at a low speed. Thus, power steering apparatuses for providing auxiliary steering forces suitable for drivers are being increasingly demanded.

SUMMARY OF THE INVENTION

Accordingly, the present invention has been made to solve the above-mentioned problems occurring in the prior art, and an aspect of the present invention provides an electric power steering apparatus adapted to provide an auxiliary steering force suitable for a driver.

According to an aspect of the present invention, there is provided an electric power steering apparatus including a motor including: a steering torque sensor configured to detect a steering torque applied to a steering wheel and output a steering torque signal corresponding to the steering torque; a speed sensor configured to detect a speed of a vehicle and output a speed signal corresponding to the speed of the vehicle; an auxiliary steering force setting unit configured to output a signal representing a linear change of a gradual increase or decrease; a map setter configured to receive a signal output from the auxiliary steering force setting unit and to set an auxiliary steering force map where a maximum steering torque, a maximum target motor current, or a ratio of a target motor current to a steering torque at a specific speed gradually increases or decreases; a current signal supply configured to output the steering torque signal and a target motor current signal corresponding to the speed signal according to the auxiliary steering force map; and a motor driving unit configured to supply a current corresponding to the target motor current signal to the motor.

The auxiliary steering setting unit may output the signal representing a linear change of a gradual increase or decrease based on manipulation of a driver.

The auxiliary steering setting unit may include a continuously moving switch or knob, or a touch screen for displaying a continuous movement.

The electric power steering apparatus may further include: a feedback unit configured to output a current difference signal obtained from a target motor current signal input from the current signal supply and an actual motor current signal corresponding to an actual current flowing through the motor; a motor current controller configured to receive the current difference signal from the feedback unit and to output a control signal for compensating for a difference between a target motor current and an actual motor current; and a current detecting unit configured to detect a motor current flowing through the motor and to output the actual motor current signal corresponding to the detected motor current to the feedback unit.

The electric power steering apparatus may further include a boundary value comparator configured to judge if the maximum steering torque, the maximum target motor current, or the ratio is within a boundary value.

According to another aspect of the present invention, there is provided an electric power assisting method implemented by an electric power steering apparatus including a motor, the method comprising: detecting a steering torque applied to a steering wheel and outputting a steering torque signal corresponding to the steering torque; detecting a speed of a vehicle and outputting a speed signal corresponding to the speed of the vehicle; outputting a signal representing a linear change of a gradual increase or decrease; receiving a signal output from the auxiliary steering force setting unit and setting an auxiliary steering force map where a maximum steering torque, a maximum target motor current, or a ratio of a target motor current to a steering torque at a specific speed gradually increases or decreases; outputting the steering torque signal and a target motor current signal corresponding to the speed signal according to the auxiliary steering force map; and supplying a current corresponding to the target motor current signal to the motor.

As discussed above, according to the present invention, a driver can vary an auxiliary steering auxiliary force linearly and it is possible to judge if the driver manipulates the electric power steering apparatus within a performance limit, thereby making it possible to stably set an auxiliary steering force.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
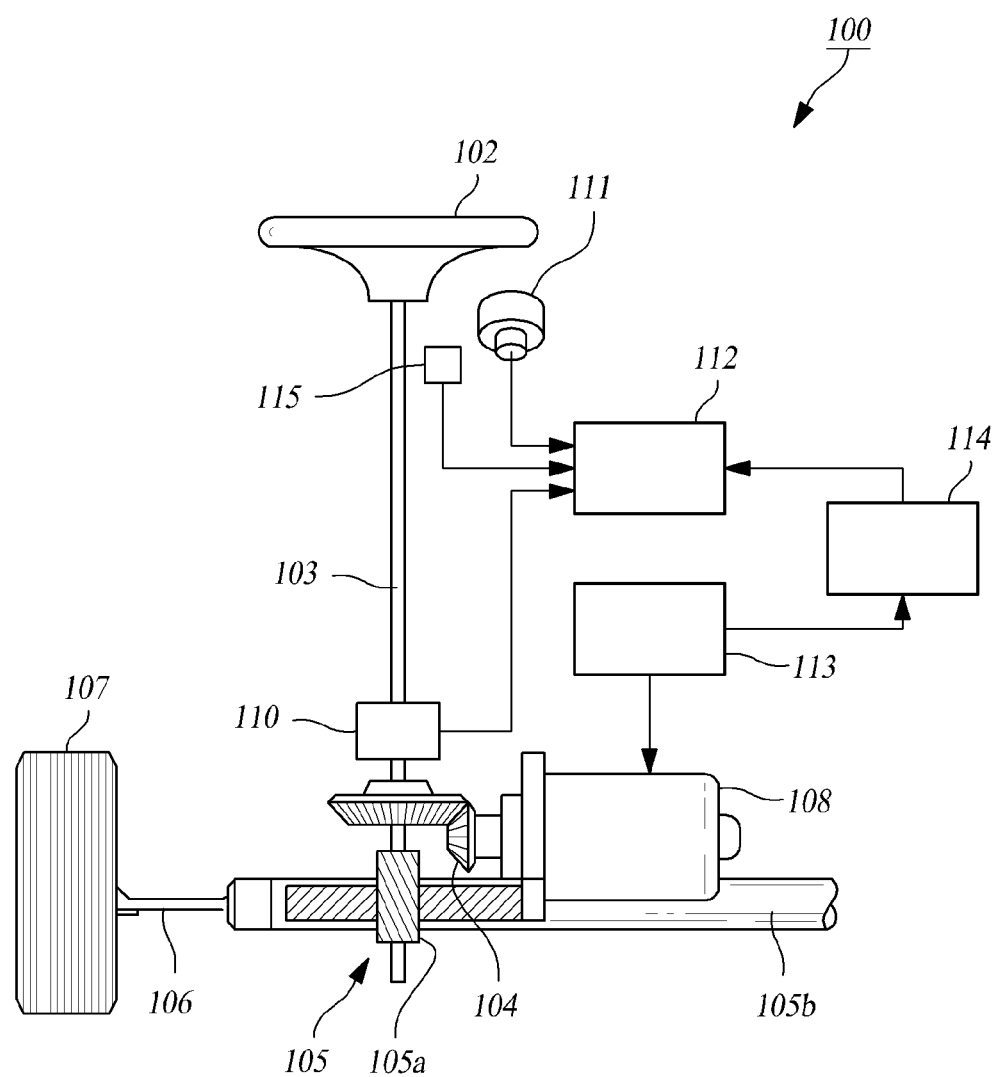
FIG. 1 is an electric power steering apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates an electric power steering apparatus according to an embodiment of the present invention. As illustrated in FIG. 1, the electric power steering apparatus 100 includes a rack/pinion mechanism 105, a support rod 106, a wheel 107, and a motor 108 for generating an auxiliary steering force. Then, the rack/pinion mechanism 105 includes a steering wheel 102, a steering shaft 103, a hypoid gear 104, a pinion 105a, and a rack shaft 105b.

The electric power steering apparatus 100 includes a steering torque sensor 110, a speed sensor 111, a control unit 112, a motor driving unit 113, and a motor current detecting unit 114.

The steering torque sensor 110 detects a steering torque applied to the steering wheel 102, and outputs a steering torque signal corresponding to the steering torque. The speed sensor 111 detects a speed of a vehicle, and outputs a speed signal corresponding to the speed of the vehicle. The control unit 112 sets a target motor current signal for driving the motor 108 according to a steering torque signal and a speed signal, and generates a signal corresponding to the target motor current signal. The motor driving unit 113 drives the motor 108 at a voltage based on a signal output from the control unit 112. The motor current detecting unit 114 detects an actual motor current corresponding to forward/reverse rotations of the motor 108, and converts the actual motor current to an actual motor current signal.

The electric power steering apparatus 100 includes an auxiliary steering force setting unit 115, so that a feature of the target motor current signal is controlled by the control unit 112 through the auxiliary steering force setting unit 115. The auxiliary steering force setting unit 115 according to the embodiment of the present invention varies auxiliary steering force not discontinuously but linearly. The auxiliary steering force setting unit 115 according to the embodiment of the present invention may include a continuously moving switch or knob, or a touch screen for displaying continuous movement.

Figure 2:
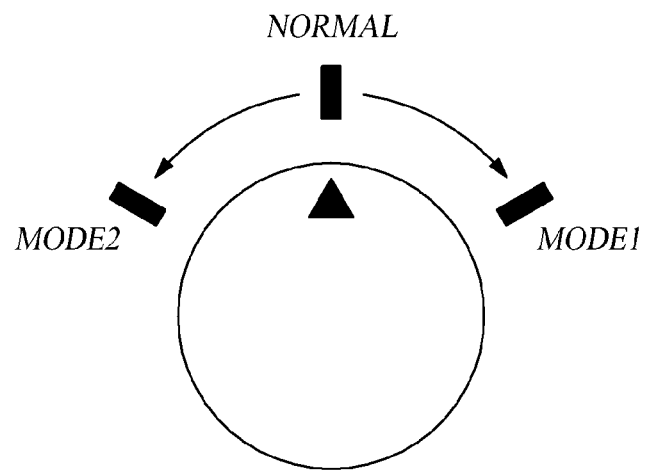
FIGS. 2 to 4 are views for illustrating an auxiliary steering force setting unit according to the embodiment of the present invention.
Figure 3:
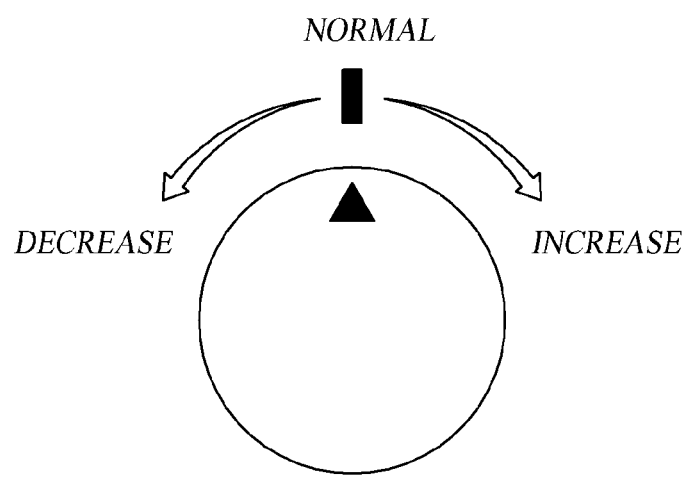

As illustrated in FIG. 2, the auxiliary steering force setting unit 115 according to the embodiment of the present invention does not output a signal corresponding to a discontinuous change through which the switch or knob selects one of Normal, Mode 1, and Mode 2. The auxiliary steering force setting unit 115 according to the embodiment of the present invention outputs a signal representing a linear change, i.e. a gradual increase or decrease. For example, as illustrated in FIG. 3, as a driver gradually rotates the knob clockwise, the auxiliary steering force setting unit 115 may output a signal for gradually increasing auxiliary steering force at a specific speed as the knob is rotated. Meanwhile, as a driver gradually rotates the knob counterclockwise, the auxiliary steering force setting unit 115 may output a signal for gradually decreasing auxiliary steering force at a specific speed.

Figure 4:
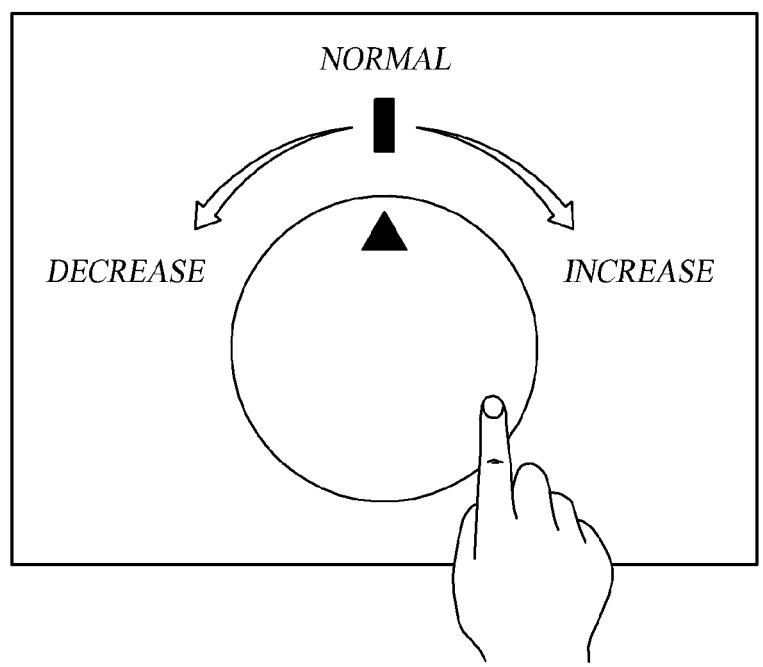

FIG. 4 illustrates that a user sets auxiliary steering force through the auxiliary steering force setting unit including a touch screen.

When a driver manipulates the steering wheel 102, the steering torque sensor 110 installed in the steering shaft 103 detects a steering torque, and supplies the detected steering torque to the control unit 112.

Rotation of the pinion 105a due to the steering torque applied to the steering shaft 103 is converted to linear axial movement of the rack shaft 105b, which changes a travelling direction of the wheel 107 though the support rod 106.

Figure 5:
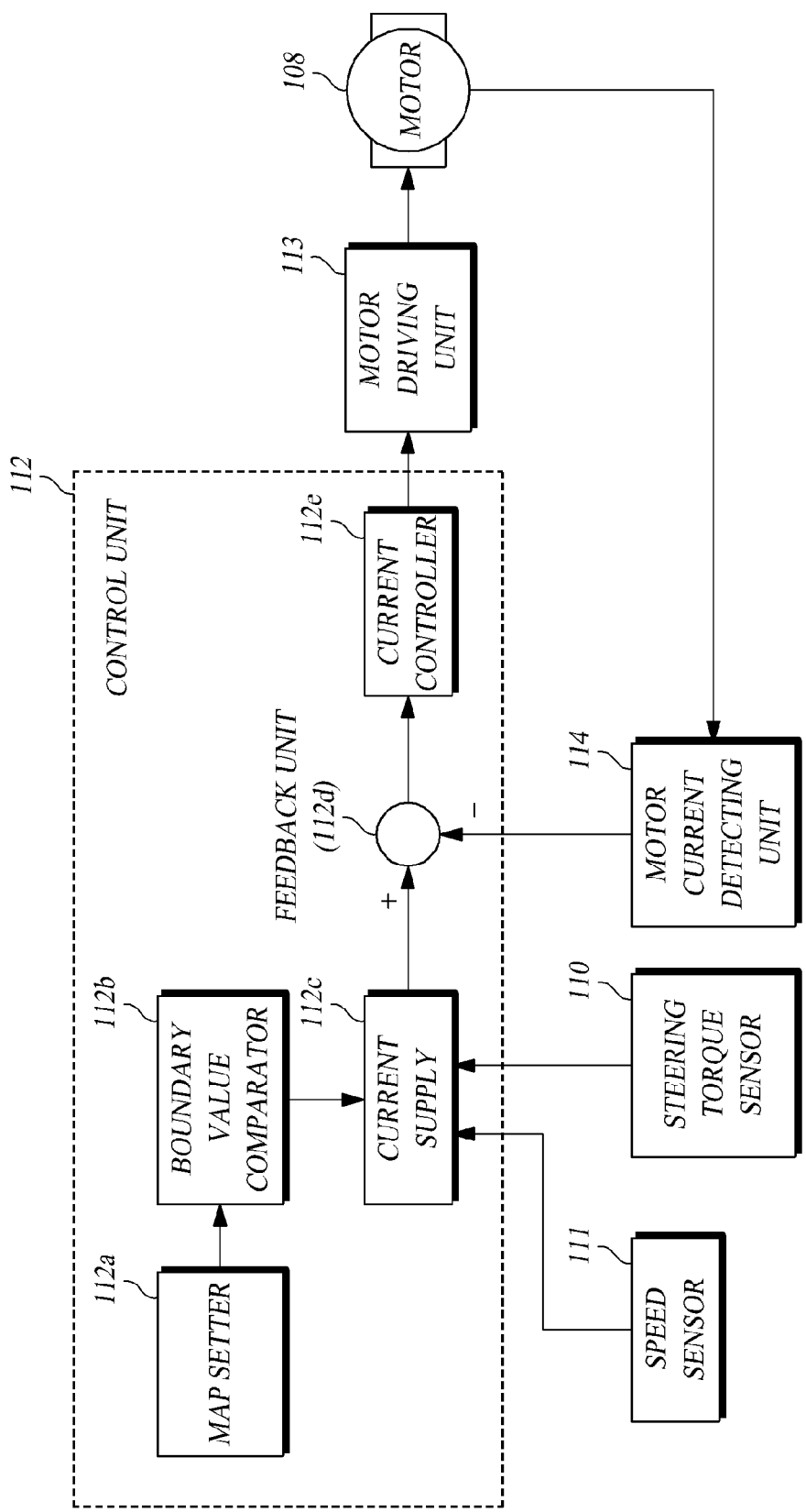
FIG. 5 illustrates a control unit according to the embodiment of the present invention.

The control unit 112 includes a microprocessor for processing various operations, a memory, etc. As illustrated in FIG. 5, the control unit 112 includes a map setter 112a, a boundary value comparator 112b, and a current signal supply 112c.

The map setter 112a receives a signal output from the auxiliary steering force setting unit 115, and gradually increases or decreases a maximum steering torque, a maximum target motor current, or a ratio of a target motor current to a steering torque to set an auxiliary steering force map.

For example, when a driver gradually rotates the knob of FIG. 3 clockwise, the map setter 112a receives a signal output from the auxiliary steering force setting unit 115, and gradually increases a maximum steering torque, a maximum target motor current, or a ratio of a target motor current to a steering torque at a specific speed. When the driver stops rotation of the knob, an auxiliary steering map corresponding to the stop position is set.

Figure 6:
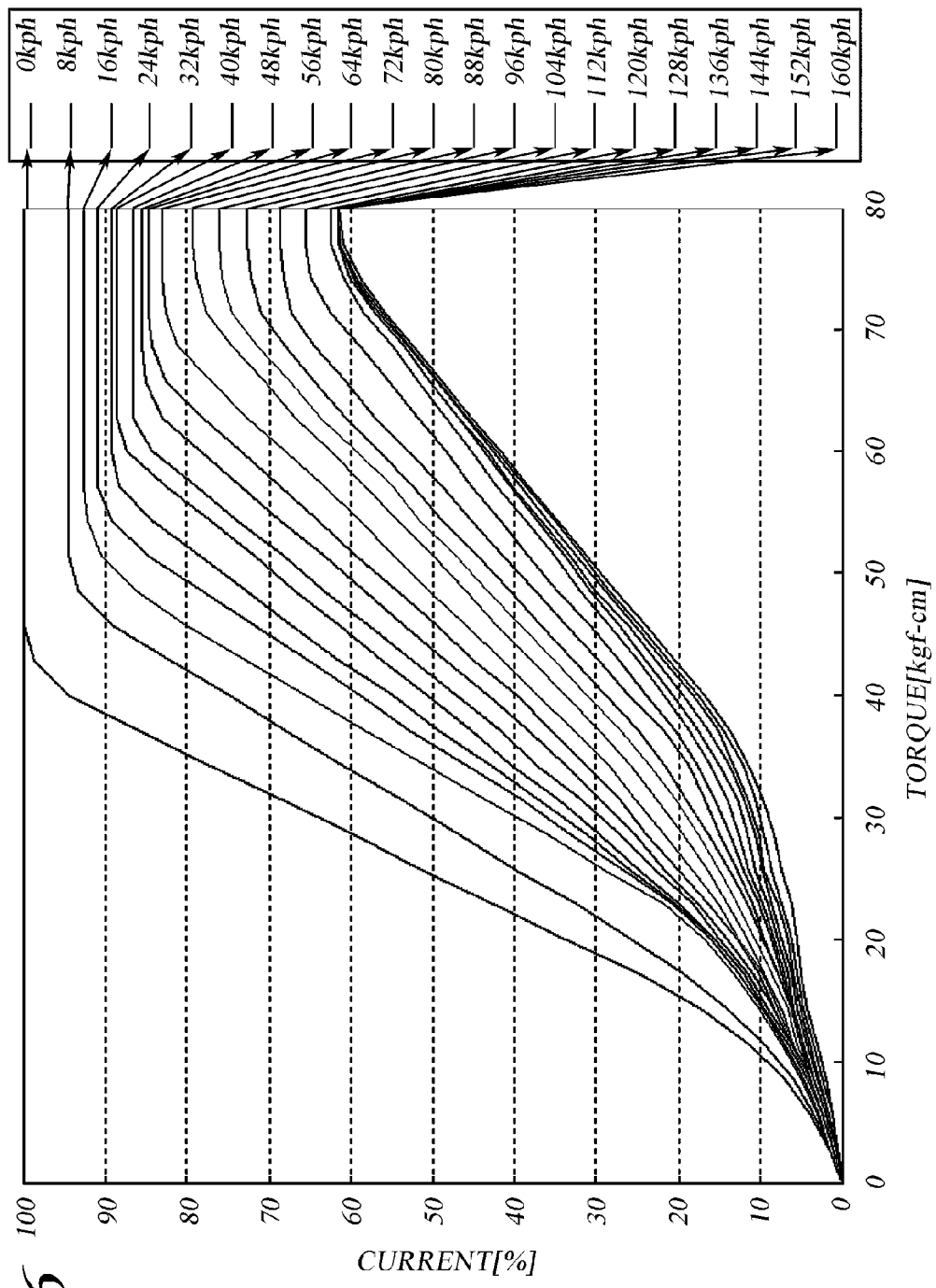
FIG. 6 is an example of an auxiliary steering force map used in the embodiment of the present invention.

FIG. 6 illustrates an example of an auxiliary steering force map used in the embodiment of the present invention. The transverse axis of FIG. 6 designates a steering torque, the right longitudinal axis of FIG. 6 designates a speed of a vehicle, and the left longitudinal axis of FIG. 6 designates a target motor current. As illustrated in FIG. 6, since a ratio of a motor current to a steering torque is small at a high speed, a driver requires a strong force to manipulate a steering wheel when the vehicle travels at a high speed. Meanwhile, since a ratio of a motor current to a steering torque is large at a low speed, a driver requires a relatively small force to manipulate a steering wheel when the vehicle travels at a low speed.

As illustrated in FIG. 6, a maximum steering torque and a maximum target motor current are set for a specific speed. For example, when a speed of a vehicle is 8 kph, a maximum steering torque is 45 kgf-cm and a maximum target motor current is set by a signal whose duty ratio is 93%. The feature of the auxiliary steering force can be changed by varying the maximum steering torque and the maximum target motor current.

The boundary value comparator 112b judges if a maximum steering torque, a maximum target motor current, or a ratio of a target motor current to a steering torque of an auxiliary steering force map which is set by the map setter 112a is within a boundary value. The boundary value represents a performance limit of the steering apparatus, and the steering apparatus for a vehicle can be normally operated if a maximum steering torque, a maximum target motor current, or a ratio of a target motor current to a steering torque is smaller than a boundary value.

When a signal informing that a maximum steering torque, a maximum target motor current, or a ratio of a target motor current to a steering torque is within a boundary value is input from the boundary value comparator 112b, the current signal supply 112c outputs a steering torque signal received from the steering torque sensor 110 and a target motor current signal corresponding to a speed signal received from the speed sensor 111 according to the auxiliary steering force map.

The motor driving unit 113 supplies a current corresponding to a target motor current signal to the motor 108.

The electric power steering apparatus according to the embodiment of the present invention may further include a feedback unit 112d, a motor current controller 112e, and a current detecting unit 114 in order to reduce or eliminate an error between the target motor current and the actual motor current.

The feedback unit 112d outputs a current difference signal obtained from a target motor current signal input from the current signal supply 112c and an actual motor current signal corresponding to an actual current flowing through the motor 108.

The motor current controller 112e receives the current difference signal from the feedback unit 112d, and outputs a control signal for compensating for a difference between the target motor current and an actual motor current. For example, when the current difference signal represents that the actual motor current is greater than the target motor current, the motor current controller 112e outputs a control signal for decreasing the actual motor current by the difference. Meanwhile, when the current difference signal represents that the actual motor current is smaller than the target motor current, the motor current controller 112e outputs a control signal for increasing the actual motor current by the difference.

The motor driving unit 113 which has received the control signal supplies a current corresponding to the control signal to the motor 108 to drive the motor 108.

The current detecting unit 114 detects a motor current flowing through the motor 108, and outputs an actual motor current signal corresponding to the detected motor current to the feedback unit 112d.

As illustrated in FIG. 2, when a driver selects one of a plurality of modes, it is difficult to satisfy a demand of the driver because options are limited. Further, since auxiliary steering force maps corresponding to the number of modes are necessary to increase the options for modes, a memory size of the control unit needs to be large.

In comparison, according to the embodiment of the present invention, a driver can vary auxiliary steering force not discontinuously but linearly. Further, since it is judged if manipulation of the driver is carried out within a performance range of the steering apparatus, i.e. within a boundary value, auxiliary steering force can be set stably.

Since an auxiliary steering force felt by a driver during driving of a vehicle is very subjective, a manner where auxiliary steering force is set by selecting one of a plurality of modes cannot satisfy many drivers. Meanwhile, according to the embodiment of the present invention, since auxiliary steering force can be varied not discontinuously but linearly, auxiliary steering force can be set to satisfy a number of drivers.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares.

Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus including a motor, the apparatus comprising:
   a steering torque sensor configured to detect a steering torque applied to a steering wheel and output a steering torque signal corresponding to the steering torque;
   a speed sensor configured to detect a speed of a vehicle and output a speed signal corresponding to the speed of the vehicle;
   an auxiliary steering force setting unit configured to output a signal representing a linear change of a gradual increase or decrease;
   a map setter configured to receive a signal output from the auxiliary steering force setting unit and to set an auxiliary steering force map where a maximum steering torque, a maximum target motor current, or a ratio of a target motor current to a steering torque at a specific speed gradually increases or decreases;
   a current signal supply configured to output the steering torque signal and a target motor current signal corresponding to the speed signal according to the auxiliary steering force map; and
   a motor driving unit configured to supply a current corresponding to the target motor current signal to the motor.

2. The electric power steering apparatus as claimed in claim 1, wherein the auxiliary steering force setting unit outputs the signal representing a linear change of a gradual increase or decrease based on manipulation of a driver.

3. The electric power steering apparatus as claimed in claim 1, wherein the auxiliary steering force setting unit includes a continuously moving switch or knob, or a touch screen for displaying a continuous movement.

4. The electric power steering apparatus as claimed in claim 1, further comprising:
- a feedback unit configured to output a current difference signal obtained from a target motor current signal input from the current signal supply and an actual motor current signal corresponding to an actual current flowing through the motor;
- a motor current controller configured to receive the current difference signal from the feedback unit and to output a control signal for compensating for a difference between a target motor current and an actual motor current; and
- a current detecting unit configured to detect a motor current flowing through the motor and to output the actual motor current signal corresponding to the detected motor current to the feedback unit.

5. The electric power steering apparatus as claimed in claim 1, further comprising a boundary value comparator configured to judge if the maximum steering torque, the maximum target motor current, or the ratio is within a boundary value.

6. An electric power assisting method implemented by an electric power steering apparatus including a motor, the method comprising steps of:
- detecting a steering torque applied to a steering wheel and outputting a steering torque signal corresponding to the steering torque;
- detecting a speed of a vehicle and outputting a speed signal corresponding to the speed of the vehicle;
- outputting a signal representing a linear change of a gradual increase or decrease;
- receiving a signal output from an auxiliary steering force setting unit and setting an auxiliary steering force map where a maximum steering torque, a maximum target motor current, or a ratio of a target motor current to a steering torque at a specific speed gradually increases or decreases;
- outputting the steering torque signal and a target motor current signal corresponding to the speed signal according to the auxiliary steering force map; and
- supplying a current corresponding to the target motor current signal to the motor.

7. The electric power assisting method as claimed in claim 6, wherein the signal representing a linear change of a gradual increase or decrease is based on manipulation of a driver.

8. The electric power assisting method as claimed in claim 6, wherein the signal representing a linear change of a gradual increase or decrease is based on a continuously moving switch or knob, or a touch screen for displaying a continuous movement.

9. The electric power assisting method as claimed in claim 6, further comprising steps of:
- outputting a current difference signal obtained from a target motor current signal input from a current signal supply and an actual motor current signal corresponding to an actual current flowing through the motor;
- outputting a control signal for compensating for a difference between a target motor current and an actual motor current by receiving the current difference signal; and
- detecting a motor current flowing through the motor and outputting the actual motor current signal corresponding to the detected motor current to a feedback unit.

10. The electric power assisting method as claimed in claim 6, further comprising the step of judging if the maximum steering torque, the maximum target motor current, or the ratio is within a boundary value.

\* \* \* \* \*